(12) United States Patent
Glover et al.

(10) Patent No.: US 8,931,275 B2
(45) Date of Patent: Jan. 13, 2015

(54) ADAPTIVE HEAT EXCHANGE ARCHITECTURE FOR OPTIMUM ENERGY RECOVERY IN A WASTE HEAT RECOVERY ARCHITECTURE

(75) Inventors: Stephen B. Glover, County Down (IE); John R. Bucknell, Redondo Beach, CA (US); Norman K. Bucknor, Troy, MI (US); Dongsuk Kum, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 193 days.

(21) Appl. No.: 13/357,202

(22) Filed: Jan. 24, 2012

(65) Prior Publication Data

US 2013/0186088 A1 Jul. 25, 2013

(51) Int. Cl.
- *F02G 5/04* (2006.01)
- *F28D 21/00* (2006.01)
- *F28F 27/02* (2006.01)
- *G05D 23/19* (2006.01)

(52) U.S. Cl.
CPC .............. *F02G 5/04* (2013.01); *F28D 21/0003* (2013.01); *F28F 27/02* (2013.01); *G05D 23/1919* (2013.01); *Y02T 10/166* (2013.01)
USPC ................................ 60/618; 165/41; 165/101

(58) Field of Classification Search
CPC . F01K 23/065; F02D 2009/0223; F02G 5/04; F28F 27/00; F04G 5/02; F28D 7/1607; F28D 7/1692; F28D 21/0003; G05D 23/1919; Y02T 10/166
USPC ..................... 60/615, 616, 618, 666
See application file for complete search history.

(56) References Cited

U.S. PATENT DOCUMENTS

| | | | |
|---|---|---|---|
| 4,901,531 A * | 2/1990 | Kubo et al. ..................... 60/618 |
| 2009/0260603 A1* | 10/2009 | Bucknell ....................... 123/564 |
| 2010/0307155 A1* | 12/2010 | Kasuya et al. .................. 60/666 |
| 2010/0319346 A1* | 12/2010 | Ast et al. ......................... 60/616 |
| 2011/0005477 A1* | 1/2011 | Terashima et al. ......... 123/41.51 |
| 2011/0041505 A1* | 2/2011 | Kasuya et al. .................. 60/660 |
| 2012/0111003 A1* | 5/2012 | Kasuya et al. .................. 60/618 |
| 2013/0014505 A1* | 1/2013 | Enokijima et al. .............. 60/615 |
| 2013/0025277 A1* | 1/2013 | Enokijima et al. .............. 60/615 |
| 2013/0125545 A1* | 5/2013 | Geskes et al. ................... 60/618 |

* cited by examiner

*Primary Examiner* — Kenneth Bomberg
*Assistant Examiner* — Jason T Newton
(74) *Attorney, Agent, or Firm* — John A. Miller; Miller IP Group, PLC

(57) ABSTRACT

A waste heat recovery system that efficiently converts waste heat from an engine coolant and an engine exhaust in a vehicle. The system includes a coolant heat exchanger that receives heat from the engine coolant, an exhaust heat exchanger that receives heat from the engine exhaust and an economizer heat exchanger. A plurality of valves control the flow of the fluid in different modes as determined by a power ratio between the heat provided by the exhaust heat exchanger and the heat provided by the coolant heat exchanger, including an economizer heat exchanger after coolant heat exchanger mode at low power ratios, where the fluid from the pump flows to the economizer heat exchanger after the coolant heat exchanger and an economizer heat exchanger before coolant heat exchanger mode at high power ratios, where the fluid from the pump flows to the economizer heat exchanger before the coolant heat exchanger.

20 Claims, 2 Drawing Sheets

ADAPTIVE HEAT EXCHANGE ARCHITECTURE FOR OPTIMUM ENERGY RECOVERY IN A WASTE HEAT RECOVERY ARCHITECTURE

BACKGROUND OF THE INVENTION

1. Field of the Invention

This invention relates generally to a waste heat recovery system on a vehicle and, more particularly, to a waste heat recovery system on a vehicle that converts engine coolant heat and engine exhaust heat to work in a Rankine cycle type heat recovery process, where the system includes valves that are selectively controlled to control whether a system fluid is first provided to a coolant heat exchanger or an economizer heat exchanger based on an exhaust heat/coolant heat power ratio.

2. Discussion of the Related Art

It is known in various industries to employ a waste heat recovery system that converts waste heat from various sources, such as an exhaust, coolant flow, etc., to a power output to provide usable work. Various types of waste heat recovery systems are known in the art. For example, a thermo-electric waste heat recovery system flows the waste heat medium over a thermo-electric material that converts the heat to electricity. Another type of waste heat recovery system employs shape memory alloys that change state or shape in response to being heated by the waste heat medium, where the change in shape is converted to work.

Another type of waste heat recovery system employs a Rankine cycle, well known to those skilled in the art, that converts heat to work by a gas expander. In a typical Rankine cycle waste heat recovery system, the system pumps a working fluid to a higher pressure and sends the high pressure fluid to a heat exchanger that receives heat from the waste heat medium, where the heated fluid changes phase from a liquid to a gas. The gas is then sent through the expander, or other device, that causes the expanding gas to perform work, such as rotating a shaft.

The automotive industry is looking into various types of waste heat recovery systems that would be compact and inexpensive enough to be suitable for a vehicle, and would efficiently convert engine exhaust and/or engine coolant heat to work to either provide additional power for operating the power train of the vehicle or provide electricity that can be stored in a vehicle battery. There is a design challenge for vehicle waste heat recovery applications to provide an efficient conversion of both the engine coolant fluid and the engine exhaust in the same waste heat recovery system for providing the work.

SUMMARY OF THE INVENTION

In accordance with the teachings of the present invention, a waste heat recovery system is disclosed that efficiently converts waste heat from an engine coolant and an engine exhaust in a vehicle. The waste heat recovery system includes a coolant heat exchanger that receives heat from the engine coolant, an exhaust heat exchanger that receives heat from the engine exhaust and an economizer heat exchanger. A pump pumps a phase changing working fluid through a plurality of lines in the system. An expander receives the fluid in a gas phase from the exhaust heat exchanger on one of the plurality of lines, the economizer heat exchanger receives the fluid in the gas phase from the expander on one of the plurality of lines and a condenser receives the fluid in the gas phase from the economizer heat exchanger on one of the plurality of lines, where the condenser converts the gas phase fluid to a liquid phase fluid that is then sent to the pump. A plurality of valves control the flow of the fluid through the plurality of fluid lines in different modes as determined by a power ratio between the heat provided by the exhaust heat exchanger and the heat provided by the coolant heat exchanger. The system is put in an economizer heat exchanger after coolant heat exchanger mode at low power ratios, where the fluid from the pump flows to the economizer heat exchanger after it flows to the coolant heat exchanger and an economizer heat exchanger before coolant heat exchanger mode at high power ratios, where the fluid from the pump flows to the economizer heat exchanger before the coolant heat exchanger.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a waste heat recovery system is merely exemplary in nature, and is in no way intended to limit the invention or its applications or uses. For example, the discussion herein has particular application for waste heat recovery on a vehicle. However, as will be appreciated by those skilled in the art, the waste heat recovery system may have application for other industries.

Figure 1:
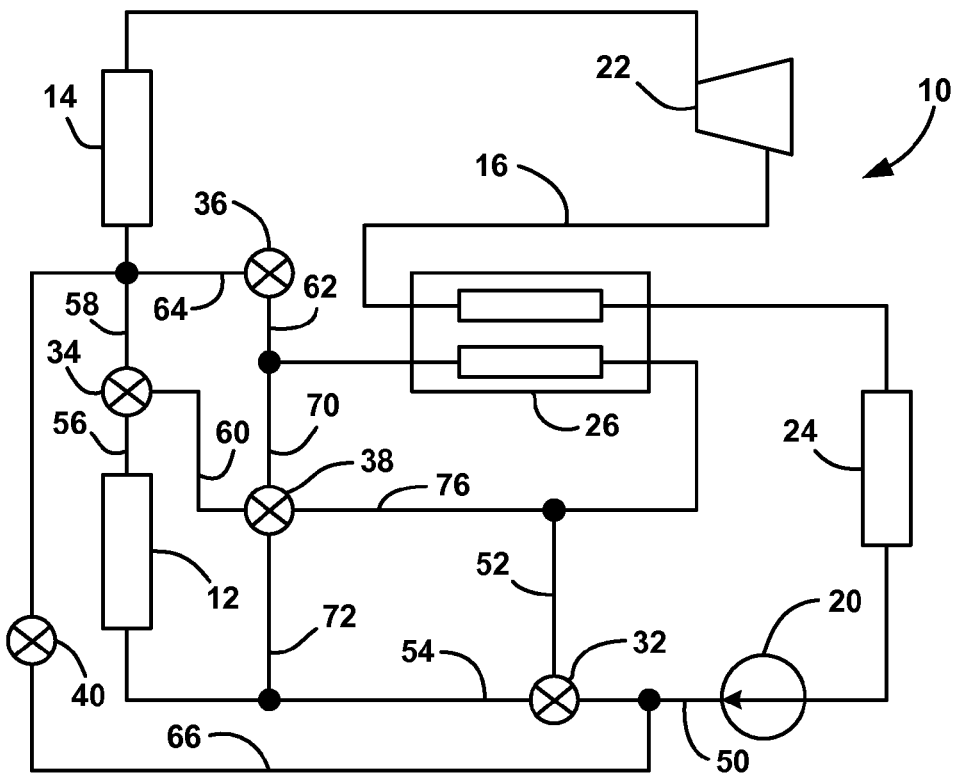
FIG. 1 is a schematic block diagram of a waste heat recovery circuit for a vehicle.

FIG. 1 is a schematic diagram of a waste heat recovery system 10 of the Rankine cycle type. As will be discussed in detail below, the system 10 is applicable to efficiently convert waste heat provided by a coolant that cools a vehicle engine and waste heat provided by an engine exhaust. The waste heat from the engine coolant in the vehicle is captured by a coolant heat exchanger 12, which can be any suitable heat exchanger provided in the coolant loop in any type of vehicle cooling system. For example, the coolant heat exchanger 12 can be the vehicle radiator, or a portion of the vehicle radiator specifically designed for the purposes discussed herein. In an alternate embodiment, it may be desirable to provide the coolant heat exchanger 12 at a location in the vehicle engine where the coolant is at its hottest for increased efficiency. The system 10 also includes an exhaust heat exchanger 14 that captures heat in the vehicle exhaust, and can be any suitable heat exchanger positioned within the exhaust gas flow from the engine to capture that heat. The coolant heat exchanger 12 is considered a low grade heat source because of the temperature differential between the engine coolant and ambient, and the exhaust heat exchanger 14 is considered a high grade heat source because of the temperature differential between the engine exhaust and ambient. As mentioned, the coolant heat exchanger 12 and the exhaust heat exchanger 14 can have any suitable design for the application discussed herein to efficiently capture heat from the engine coolant and engine exhaust, respectively, where that specific design is not overly important to the operation of the system 10.

The system 10 includes a number of lines 16 through which a suitable system working fluid flows that is able to effectively change state between a liquid and gas phase as is necessary for a Rankine cycle type waste heat recovery system. Many different types of phase changing fluids would be applicable for the system 10, including water. The system 10 also includes a pump 20 that pumps the working fluid through the lines 16 to provide flow and increase the pressure of the fluid. Further, the system 10 includes an expander 22 that receives the fluid when it is in a gas phase, where the expander 22 causes the gas phase fluid to expand, which is operable to rotate a shaft (not shown) through fan blades (not shown), or other mechanical means, such as a displacing a piston, in a manner that is well understood by those skilled in the art. The expanded fluid still in the gas phase is then condensed by a condenser 24 to convert the gas phase fluid back into a liquid phase fluid that is then sent to the pump 20 to increase the pressure of the liquid fluid. The system 10 also includes an economizer heat exchanger 26 that receives the expanded gas phase fluid from the expander 22, which still has considerable heat, to increase the temperature of the liquid phase fluid in a different line in the system 10, as will be discussed in more detail below, before the gas phase fluid is provided to the condenser 24. Particularly, the economizer heat exchanger 26 recovers energy that would normally be rejected in the condenser 24, and transfers that energy back into the working fluid to increase the net power output of the expander 22.

Figure 2:
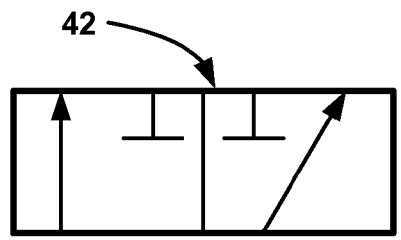
FIGS. 2-5 show examples for the valves used in the waste heat recovery system shown in FIG. 1.
Figure 4:
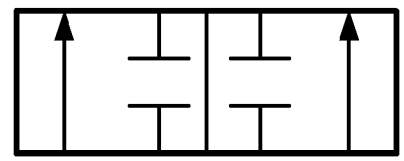
Figure 3:
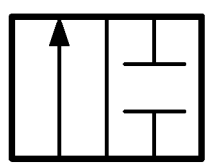
Figure 5:
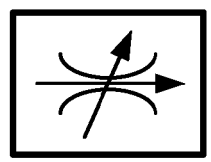

The liquid or gas phase fluid flows through the lines 16 in the system 10 in a controlled manner through a number of valves so that the system 10 makes efficient use of the low grade heat source provided by the coolant heat exchanger 12 and the high grade heat source provided by the exhaust heat exchanger 14. Particularly, in this non-limiting embodiment, the system 10 includes five valves 32, 34, 36, 38 and 40, where a representation of the valves 32 and 34 is shown in FIG. 2 as valve 42, a representation of the valve 36 is shown in FIG. 3 as valve 44, a representation of the valve 38 is shown in FIG. 4 as valve 46 and a representation of the valve 40 is shown in FIG. 5 as flow regulating valve 48. The valve 32 either allows flow from line 50 connected to the output of the pump 20 to either line 52 or line 54. Likewise, the valve 34 allows flow from line 56 at the output of the coolant heat exchanger 12 to line 58 or line 60. The valve 36 allows flow from line 62 to line 64 or blocks flow from the line 62 to the line 64. The valve 40 allows flow on line 66 from the pump 20 or prevents flow on the line 66 from the pump 20 and is a by-pass valve, as discussed below. The valve 38 allows flow from line 70 to line 72 and prevents flow from the line 60 to line 76, or allows flow from the line 60 to the line 76 and prevents flow from the line 70 to the line 72.

The present invention proposes controlling the position of the valves 32-40 depending on the power ratio of the exhaust heat that is currently available to the coolant heat that is currently available in order to optimize the heat provided to the expander 22 to maximize its output. In addition to the power ratio, the system 10 may consider other parameters to change the position of the valves 32-40 for optimum performance, such as the particular fluid being used, a peak system temperature, a peak system pressure, atmospheric or condenser temperature, etc. The extent to which the system 10 needs to adapt and the amount of extra work and efficiency that can be extracted by doing so will depend on the actual fluid used and a variation of these parameters.

The load on the engine effectively dictates the ratio of the heat power rejected into the coolant and the exhaust stream. This heat rejection ratio is also called power ratio. Particularly, at low engine loads, the exhaust-to-coolant power ratio is low, typically less than 1, but at high engine loads, the exhaust-to-coolant power ratio is higher, nominally a maximum of about 2-2.5 depending on what power can be recovered from the exhaust. Depending on the power ratio, the optimum configuration of the valves 32-40 changes, and the sequence of the heat exchangers 12, 14 and 26 varies. By-passing certain heat exchangers at specific power ratios also optimizes the performance of the system 10 and maximizes the output by allowing the maximum heat to be extracted from a particular source without depleting another source. The control of the system 10 to optimize the position of the heat exchangers 12 and 26 improves the output of the expander 22 between 66% and 150% depending on the power ratio and the initial position of the valves 32-40. The use of the by-pass valve 40 can increase the output of the expander 22 by up to 25%. For a typical lightly loaded drive cycle, such as a city cycle, the system 10 with by-pass control provides a 25%-66% improvement in the output power of the expander 22. The percentage improvements are relative to a nominal fixed heat exchanger configuration where the working fluid is pressurized, and then passes through the economizer heat exchanger 26, the coolant heat exchanger 12 and the exhaust heat exchanger 14 in sequence.

Figure 6:
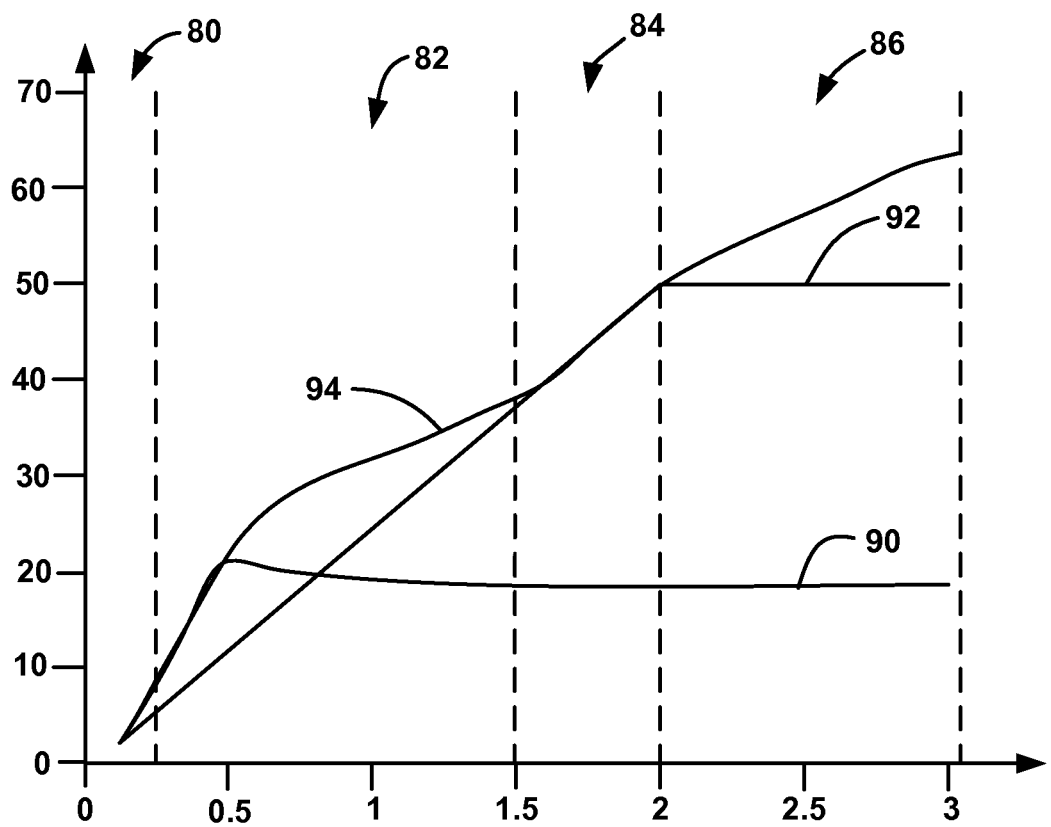
FIG. 6 is a graph with exhaust heat/coolant heat power ratio on the horizontal axis and engine load output on the vertical axis showing a difference between providing a system working fluid to an economizer heat exchanger after a coolant heat exchanger, providing the working fluid to the economizer heat exchanger before the coolant heat exchanger and optimizing the control between whether the working fluid is provided to the economizer heat exchanger before or after the coolant heat exchanger for the engine load output range in the system shown in FIG. 1.

FIG. 6 is a graph with the power ratio on the horizontal axis and engine load, or a representation of the engine load, on the vertical axis that shows a difference between providing a system working fluid to an economizer heat exchanger after a coolant heat exchanger, providing the working fluid to the economizer heat exchanger before the coolant heat exchanger and optimizing the control between whether the working fluid is provided to the economizer heat exchanger before or after the coolant heat exchanger for the engine load output range. FIG. 6 generally shows the relationship between the power ratio and the expander output at a nominal atmospheric (ambient) temperature where the heat power rejected to the coolant is about 100 kW and the heat power rejected to the exhaust varies from 12.5 to 300 kW. FIG. 6 defines four control modes including modes where the fluid from the pump 20 flows through the economizer heat exchanger 26 before flowing through the coolant heat exchanger 12 in an economizer heat exchanger before coolant heat exchanger mode, or the fluid flows through the economizer heat exchanger 26 after flowing through the coolant heat exchanger 12, but before the fluid flows through the exhaust heat exchanger 14 in an economizer heat exchanger after coolant heat exchanger mode.

If the by-pass valve 40 is open, then two additional modes are provided including an economizer heat exchanger before coolant heat exchanger plus by-pass mode and an economizer heat exchanger after coolant heat exchanger plus by-pass mode. When the by-pass valve 40 is open for the two by-pass modes, the flow rate of the valve 40 determines how much of the fluid will flow through the by-pass valve 40 and the coolant heat exchanger 12 or the economizer heat exchanger 26 in parallel, depending on the mode. If the temperature of the coolant exiting the coolant heat exchanger 12 can vary or float, then a by-pass mode is optional since the temperature will be controlled by the mass flow in the line 16 and the heat absorbed via the heat exchanger 12.

The four control modes include the direction of the flow through the economizer heat exchanger 26 after passing through the coolant heat exchanger 12 represented in region 80 at a low power ratio; flow through the economizer heat exchanger 26 after passing through the coolant exchanger 12 with by-pass through the line 66 represented in region 82 at a next higher power ratio; flow through the economizer heat exchanger 26 before passing through the coolant heat exchanger 12 represented in region 84 at a next higher power ratio; and flow through the economizer heat exchanger 26 before passing through the coolant heat exchanger 12 with by-pass through the line 66 represented in region 86 at a next higher power ratio.

Graph line 90 represents the amount of heat that is obtained by the system 10 if the valves 32-40 are maintained in the economizer heat exchanger before coolant heat exchanger mode across the entire range of heat rejection power ratios for a lightly to heavily loaded engine, graph line 92 represents the heat obtained by the system 10 if the valves 32-40 are maintained in the economizer heat exchanger after coolant mode heat exchanger mode across the entire range of heat rejection power ratios for the engine, and graph line 94 represents an optimized heat that is obtained by the system 10 when the valves 32-40 are controlled in the manner discussed herein between the economizer heat exchanger after coolant exchanger mode, the economizer heat exchanger after coolant flow heat exchanger plus by-pass mode, the economizer heat exchanger before the coolant heat exchanger mode and the economizer heat exchanger before coolant heat exchanger plus by-pass mode. As is apparent, the graph line 94 shows the most power from the expander 22 as a function of heat rejection power ratio.

When the system 10 is in the economizer heat exchanger after coolant heat exchanger mode of the region 80, the fluid from the pump 20 flows through the valve 32 into the line 54, then through the coolant heat exchanger 12, then through the valve 34 on the lines 56 and 60, then through the valve 38 through the lines 60 and 76, then through the economizer heat exchanger 26, then through the valve 36 on the lines 62 and 64, then through the exhaust heat exchanger 14, then through the expander 22, then through the economizer heat exchanger 26 and the condenser 24 back to the pump 20.

When the system 10 is in the economizer heat exchanger after the coolant heat exchanger plus by-pass mode of the region 82, all of the valves 32-38 are in the position discussed above for the region 80, but the valve 40 is also open allowing the working fluid to flow both through the valve 32 to the coolant heat exchanger 12 and through the line 66 around the coolant heat exchanger 12 in parallel.

When the system 10 is in the economizer heat exchanger before the coolant heat exchanger mode of the region 84, the fluid flows from the pump 20 through the valve 32 into the line 52, then through the economizer heat exchanger 26, then through the valve 38 on the lines 70 and 72, then through the coolant heat exchanger 12, then through the valve 34 on the lines 56 and 58 to the exhaust heat exchanger 14 and then back to the pump 20 through the expander 22, the economizer heat exchanger 26 and the condenser 24.

When the system 10 is in the economizer heat exchanger before the coolant heat exchanger plus by-pass mode of the region 86, the valves 32-38 are in the same position as the economizer heat exchanger before the coolant heat exchanger mode of the region 84, but the by-pass valve 40 is also open allowing the working fluid to flow both through the valve 32 to the economizer heat exchanger 26 and through the line 66 around the coolant heat exchanger 12 in parallel.

Figure 7:
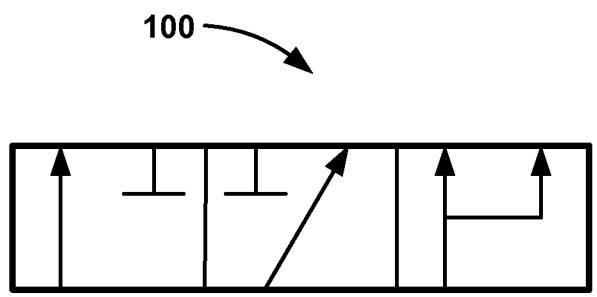
FIGS. 7 and 8 show other examples for two of the valves used in the waste heat recovery system shown in FIG. 1.
Figure 8:
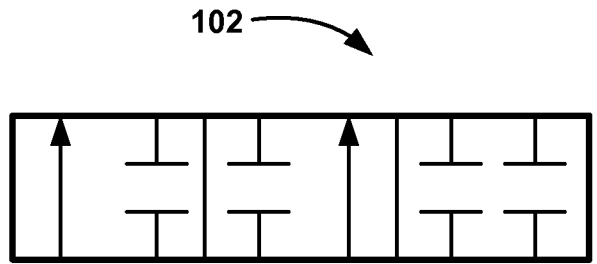

In an alternate embodiment that may further optimize the heat recovery from the engine coolant and engine exhaust, the valves 32 and 38 are replaced with three-way valves to provide a parallel mode. Particularly, a representation of the valve 32 is shown in FIG. 7 as three-way valve 100 and a representation of the valve 38 is shown in FIG. 8 as three-way valve 102. The three-way valves 100 and 102 allow the economizer heat exchanger after coolant heat exchanger mode of the region 80 and the economizer heat exchanger before the coolant heat exchanger mode of the region 84 at valve positions 1 and 2, respectively, in the same manner as discussed above. However, the valves 100 and 102 also have a third position for the parallel mode where the valve 100 allows fluid flow from the pump 20 into both of the lines 52 and 54 at the same time to send the fluid to both the coolant heat exchanger 12 and the economizer heat exchanger 26 in parallel, where the valve 102 blocks flow. When the system 10 is in the parallel mode, the valve 34 needs to be in the first position to allow flow from the line 56 to the line 58 and the valve 36 needs to be in the first position to allow flow from the line 62 to the line 64. There also may be an occasion to provide the desired optimization where the parallel mode also includes by-pass, where the valve 40 is open to provide a parallel plus by-pass mode.

The system 10 has a number of advantages for waste heat recovery performance for a system having high and low grade heat sources, including the system adapts to the power ratio of the heat between the low and high grade heat sources by positioning the heat exchangers and the by-passes in the system 10, the system 10 optimizes the performance relative to a fixed geometry system by expanding the range of heat power over which the system functions, and the system 10 applies waste heat recovery to the widest vehicle operating range.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:
1. A waste heat recovery system comprising:
a plurality of system fluid lines;
a first heat exchanger receiving heat from a low grade heat source;
a second heat exchanger receiving heat from a high grade heat source;
a pump for pumping a phase changing fluid through the plurality of fluid lines;
an expander receiving the fluid in a gas phase from the second heat exchanger on one of the plurality of fluid lines;

an economizer heat exchanger receiving the fluid in the gas phase from the expander on one of the plurality of fluid lines;
a condenser receiving the fluid in the gas phase from the economizer heat exchanger on one of the plurality of fluid lines; and
a plurality of valves configured to control the flow of the fluid through the plurality of fluid lines in different flow modes as determined by a power ratio that is a ratio of heat power provided by the second heat exchanger to heat power provided by the first heat exchanger, wherein the system is put in an economizer heat exchanger after first heat exchanger mode when the power ratio is a predetermined low power ratio where the fluid from the pump flows to the economizer heat exchanger after the fluid flows to the first heat exchanger and an economizer heat exchanger before first heat exchanger mode when the power ratio is a predetermined high power ratio where the fluid from the pump flows to the economizer heat exchanger before the first heat exchanger.

2. The system according to claim 1 wherein the plurality of valves is five valves.

3. The system according to claim 1 wherein the system is on a vehicle, and wherein the first heat exchanger is a coolant heat exchanger on the vehicle and the second heat exchanger is an exhaust heat exchanger on the vehicle.

4. The system according to claim 1 wherein one of the plurality of valves is a by-pass valve that allows at least some of the working fluid to by-pass the first heat exchanger, and wherein another flow mode is an economizer heat exchanger after first heat exchanger plus by-pass mode when the system is in the economizer heat exchanger after first heat exchanger mode and the by-pass valve is opened at a power ratio greater than the low power ratio for the economizer heat exchanger after first heat exchanger mode and less than the power ratio for the economizer heat exchanger before first heat exchanger mode.

5. The system according to claim 1 wherein one of the plurality of valves is a by-pass valve that allows at least some of the working fluid to by-pass the first heat exchanger, and wherein another flow mode is an economizer heat exchanger before coolant heat exchanger plus by-pass mode when the system is in the economizer heat exchanger before first heat exchanger mode and the by-pass valve is opened at a power ratio greater than the high power ratio for the economizer heat exchanger before first heat exchanger mode.

6. The system according to claim 1 wherein the plurality of valves are controlled to control the flow of the fluid through the plurality of fluid lines in the different modes as determined by other parameters in addition to the power ratio including the type of fluid being used, a heat ratio between the high grade heat source and the low grade heat source, atmospheric temperature, condenser temperature and system pressure.

7. he system according to claim 1 wherein the plurality of valves are also configured to control the flow of the fluid through the plurality of fluid lines in a parallel mode where the fluid flows through both the economizer heat exchanger and the first heat exchanger in parallel.

8. A waste heat recovery system on a vehicle, said system comprising:
a plurality of system fluid lines;
a coolant heat exchanger that receives heat from a coolant that cools a vehicle engine;
an exhaust heat exchanger that receives heat from an engine exhaust on the vehicle;
a pump for pumping a phase changing fluid through the plurality of fluid lines;
an expander receiving the fluid in a gas phase from the exhaust heat exchanger on one of the plurality of fluid lines;
an economizer heat exchanger receiving the fluid in the gas phase from the expander on one of the plurality of fluid lines;
a condenser receiving the fluid in the gas phase from the economizer heat exchanger on one of the plurality of fluid lines; and
a plurality of valves configured to control the flow of the fluid through the plurality of fluid lines in different flow modes, said flow modes including an economizer heat exchanger after coolant heat exchanger mode where the fluid flows to the coolant heat exchanger before flowing to the economizer heat exchanger, an economizer heat exchanger before coolant heat exchanger mode where the fluid flows to the economizer heat exchanger before the coolant heat exchanger and a parallel mode where the fluid flows to both the economizer heat exchanger and the coolant heat exchanger in parallel.

9. The system according to claim 8 wherein the system is put in the different flow modes as determined by a power ratio between the heat provided by the exhaust heat exchanger and the heat provided by the coolant heat exchanger.

10. The system according to claim 9 wherein the system is put in the economizer heat exchanger after coolant heat exchanger mode at low power ratios where the fluid from the pump flows to the economizer heat exchanger after the fluid flows to the coolant heat exchanger and the economizer heat exchanger before coolant heat exchanger mode at high power ratios where the fluid from the pump flows to the economizer heat exchanger before the coolant heat exchanger.

11. The system according to claim 10 wherein one of the plurality of valves is a by-pass valve that allows at least some of the working fluid to by-pass the coolant heat exchanger, and wherein another flow mode is an economizer heat exchanger after coolant heat exchanger plus by-pass mode when the system is in the economizer heat exchanger after coolant heat exchanger mode and the by-pass valve is opened at a power ratio greater than the low power ratio for the economizer heat exchanger after coolant heat exchanger mode and less than the power ratio for the economizer heat exchanger before coolant heat exchanger mode.

12. The system according to claim 10 wherein one of the plurality of valves is a by-pass valve that allows at least some of the working fluid to by-pass the coolant heat exchanger, and wherein another flow mode is an economizer heat exchanger before coolant heat exchanger plus by-pass mode when the system is in the economizer heat exchanger before coolant heat exchanger mode and the by-pass valve is opened at a power ratio greater than the high power ratio for the economizer heat exchanger before coolant heat exchanger mode.

13. The system according to claim 9 wherein the plurality of valves are configured to control the flow of the fluid through the plurality of fluid lines in the different modes as determined by other parameters in addition to the power ratio including the type of fluid being used, a heat ratio between a high grade heat source and a low grade heat source, atmospheric temperature, condenser temperature and system pressure.

14. The system according to claim 9 wherein the plurality of valves is five valves.

15. A waste heat recovery system on a vehicle, said system comprising:

a coolant heat exchanger that receives heat from a coolant that cools a vehicle engine;

an exhaust heat exchanger that receives heat from an engine exhaust on the vehicle;

an economizer heat exchanger that receives a working fluid; and a plurality of valves configured to control the flow of the working fluid through a plurality of fluid lines in different flow modes, said flow modes including an economizer heat exchanger after coolant heat exchanger mode where the working fluid flows to the coolant heat exchanger before flowing to the economizer heat exchanger and an economizer heat exchanger before coolant heat exchanger mode where the working fluid flows to the economizer heat exchanger before the coolant heat exchanger.

16. The system according to claim 15 wherein the system is put in the different flow modes as determined by a power ratio between the heat provided by the exhaust heat exchanger and the heat provided by the coolant heat exchanger.

17. The system according to claim 16 wherein one of the plurality of valves is a by-pass valve that allows at least some of the working fluid to by-pass the coolant heat exchanger, and wherein another flow mode is an economizer heat exchanger after coolant heat exchanger plus by-pass mode when the system is in the economizer heat exchanger after coolant heat exchanger mode and the by-pass valve is opened at a power ratio greater than the low power ratio for the economizer heat exchanger after coolant heat exchanger mode and less than the power ratio for the economizer heat exchanger before coolant heat exchanger mode.

18. The system according to claim 16 wherein one of the plurality of valves is a by-pass valve that allows at least some of the working fluid to by-pass the coolant heat exchanger, and wherein another flow mode is an economizer heat exchanger before coolant heat exchanger plus by-pass mode when the system is in the economizer heat exchanger before coolant heat exchanger mode and the by-pass valve is opened at a power ratio greater than the high power ratio for the economizer heat exchanger before coolant heat exchanger mode.

19. The system according to claim 15 wherein the plurality of valves are also configured to control the flow of the working fluid through the plurality of fluid lines in a parallel mode where the working fluid flows through both the economizer heat exchanger and the coolant heat exchanger in parallel.

20. The system according to claim 15 wherein the plurality of valves is five valves.

* * * * *